US010593024B2

(12) United States Patent
Cheung (10) Patent No.: US 10,593,024 B2
(45) Date of Patent: Mar. 17, 2020

(54) IMAGE INPAINTING ON ARBITRARY SURFACES

(71) Applicant: Hong Kong Applied Science and Technology Research Institute Co., Ltd., Shatin New Territories (HK)

(72) Inventor: Ka Chun Cheung, Chai Wan (HK)

(73) Assignee: HONG KONG APPLIED SCIENCE AND TECHNOLOGY RESEARCH INSTITUTE CO., LTD., Shatin (HK)

( * ) Notice: Subject to any disclaimer, the term of this patent is extended or adjusted under 35 U.S.C. 154(b) by 143 days.

(21) Appl. No.: 15/945,576

(22) Filed: Apr. 4, 2018

(65) Prior Publication Data

US 2019/0311466 A1    Oct. 10, 2019

(51) Int. Cl.
  *G06K 9/00* (2006.01)
  *G06T 5/00* (2006.01)
  *G06T 19/20* (2011.01)

(52) U.S. Cl.
  CPC .............. *G06T 5/005* (2013.01); *G06T 19/20* (2013.01)

(58) Field of Classification Search
  None
  See application file for complete search history.

(56) References Cited

U.S. PATENT DOCUMENTS

| 7,881,913 B2 | 2/2011 | Smith et al. | |
| 9,317,906 B2 * | 4/2016 | Cho | G06T 5/005 |
| 9,600,869 B2 | 3/2017 | Chiang et al. | |
| 10,074,209 B2 * | 9/2018 | Fradet | H04N 13/261 |
| 2010/0232654 A1 | 9/2010 | Rahmes et al. | |
| 2012/0086775 A1 | 4/2012 | Bae et al. | |

(Continued)

FOREIGN PATENT DOCUMENTS

| CN | 102695064 A | 9/2012 |
| CN | 103024421 B | 3/2015 |
| CN | 103886561 B | 5/2017 |

OTHER PUBLICATIONS

International Search Report and Written Opinion of the International Searching Authority regarding International application No. PCT/CN2018/082549 filing date Apr. 10, 2018, dated Jan. 4, 2019, 9 pages.

(Continued)

*Primary Examiner* — Hadi Akhavannik
(74) *Attorney, Agent, or Firm* — Brinks Gilson & Lione (57) ABSTRACT

A method and a device for image inpainting on arbitrary surfaces in three-dimensional space are described for inpainting a region of a three-dimensional image utilizing a partial differential equation. The method includes obtaining a three-dimensional image on a surface S in three-dimensional space, and each point of the image includes an image point value and a position vector. The method includes locating an inpainting region D and generating an inpainting mask. The method further includes calculating image point values for points inside the inpainting region D and creating a second three-dimensional image to obtain an inpainted image. The present disclosure solves technical problems that previous methods do not work well on three-dimensional images on arbitrary surfaces and improves image inpainting technology.

19 Claims, 8 Drawing Sheets
(4 of 8 Drawing Sheet(s) Filed in Color)

(56) References Cited

U.S. PATENT DOCUMENTS

2012/0105435 A1* 5/2012 Chen .................... G06T 15/205
 345/419
2013/0011045 A1 1/2013 Lee et al.
2015/0325044 A1* 11/2015 Lebovitz ................ G06T 15/04
 345/420
2017/0024864 A1 1/2017 Karande et al.

OTHER PUBLICATIONS

Wang, Linlin, et al., "*Image Inpainting Based on Radial Basis Function,*" 2011 International Conference on Computer Science and Network Technology, (4p).

Lin, Shu-Chin, et al., "*Filling Holes in 3D Scanned Model Base on 2D Image Inpainting,*" 2017 $10^{th}$ International Conference on Ubi-media Computing and Workshops (Ubi-Media), (6p).

* cited by examiner

IMAGE INPAINTING ON ARBITRARY SURFACES

FIELD OF THE TECHNOLOGY

A method and a device for image inpainting on an arbitrary surface in three-dimensional space utilizing a partial differential equation are described.

BACKGROUND OF THE DISCLOSURE

Figure 1A:
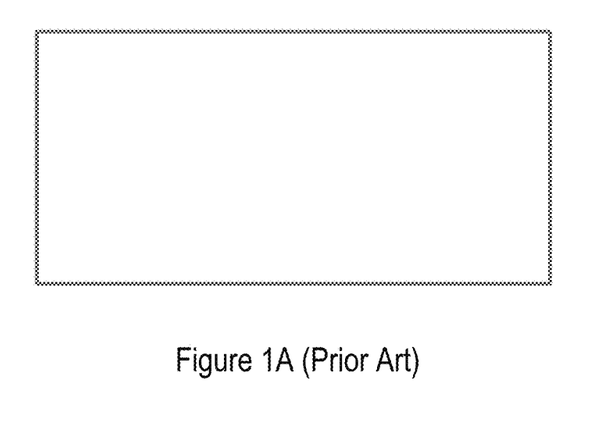
FIG. 1A shows a domain of a traditional two-dimensional flat surface.
Figure 1B:
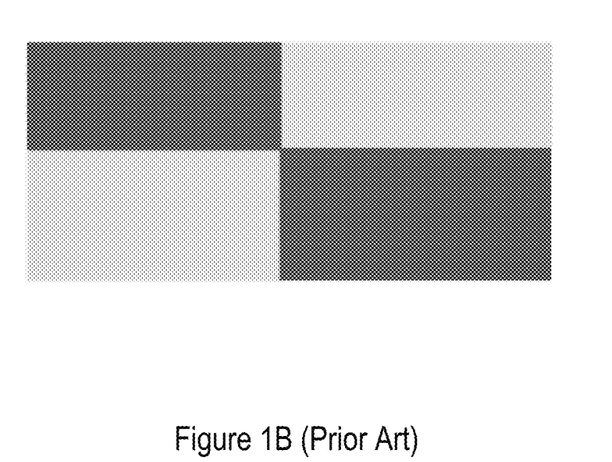
FIG. 1B shows a two-dimensional image on the domain as shown in FIG. 1A.

Image inpainting can reconstruct a lost or deteriorated part of an image. Some methods for image inpainting on flat surfaces have been known for some time. However, these known methods only work well on two-dimensional images, for example, images on flat surfaces. FIG. 1A shows an example of a flat surface, and FIG. 1B shows an example of a two-dimensional image on the flat surface. The existing methods do not work well on arbitrary three-dimensional images, i.e., images on arbitrary surfaces in three-dimensional space are not easily transferred to 2D space and the transformation will induce certain kind of distortion which affect the inpainting result. To improve the image inpainting technology and solve this problem, it is desirable to have a method for image inpainting on arbitrary surfaces in three-dimensional space.

SUMMARY OF THE INVENTION

Embodiments of the present disclosure include a method and a device for image inpainting on an arbitrary surface in three-dimensional space utilizing a partial differential equation.

According to an aspect of the embodiments of the present disclosure, a method for image inpainting includes obtaining, by a device having a memory storing instructions and a processor in communication with the memory, a first three-dimensional image. The first three-dimensional image is an image on a surface S in three-dimensional space, and each point of the first three-dimensional image comprises an image point value and a position vector in the three-dimensional space. The method includes locating, by the device, an inpainting region D of the first three-dimensional image and generating, by the device, an inpainting mask corresponding to the inpainting region D. The method also includes calculating, by the device according to the inpainting region D, image point values for points inside the inpainting region D. The method further includes creating, by the device based on the calculated image point values for points inside the inpainting region D, a second three-dimensional image on the surface S in the three-dimensional space.

According to another aspect of the embodiments of the present disclosure, a device for imaging inpainting includes a memory storing instructions and a processor in communication with the memory. When the processor executes the instructions, the processor is configured to cause the device to obtain a first three-dimensional image. The first three-dimensional image is an image on a surface S in three-dimensional space, and each point of the first three-dimensional image comprises an image point value and a position vector in the three-dimensional space. The processor is configured to cause the device to locate an inpainting region D of the first three-dimensional image, and to generate an inpainting mask corresponding to the inpainting region D. The processor is configured to cause the device to calculate, according to the inpainting region D, image point values for points inside the inpainting region D. The processor is configured to further cause the device to create, based on the calculated image point values for points inside the inpainting region D, a second three-dimensional image on the surface S in the three-dimensional space.

According to another aspect of the embodiments of the present disclosure, a non-transitory computer readable storage medium stores instructions. The instructions, when executed by a processor, cause the processor to perform obtaining a first three-dimensional image. The first three-dimensional image is an image on a surface S in three-dimensional space, and each point of the first three-dimensional image comprises an image point value and a position vector in the three-dimensional space. The instructions, when executed by the processor, cause the processor to perform locating an inpainting region D of the first three-dimensional image and generating an inpainting mask corresponding to the inpainting region D. The instructions, when executed by the processor, cause the processor to perform calculating, according to the inpainting region D, image point values for points inside the inpainting region D. The instructions, when executed by the processor, further cause the processor to perform creating, based on the calculated image point values for points inside the inpainting region D, a second three-dimensional image on the surface S in the three-dimensional space.

BRIEF DESCRIPTION OF THE DRAWINGS

The system and method described below may be better understood with reference to the following drawings and description of non-limiting and non-exhaustive embodiments. The components in the drawings are not necessarily to scale. Emphasis instead is placed upon illustrating the principles of the disclosure. The patent or application file contains at least one drawing executed as a photograph and in color. Copies of this patent or patent application with photographs and color drawings will be provided by the Office upon request and payment of the necessary fee.

DETAILED DESCRIPTION

The method will now be described with reference to the accompanying drawings, which show, by way of illustration, specific exemplary embodiments. The method may, however, be embodied in a variety of different forms and, therefore, covered or claimed subject matter is intended to be construed as not being limited to any exemplary embodiments set forth. The method may be embodied as methods, devices, components, or systems. Accordingly, embodiments may, for example, take the form of hardware, software, firmware or any combination thereof.

Throughout the specification and claims, terms may have nuanced meanings suggested or implied in context beyond an explicitly stated meaning. Likewise, the phrase "in one embodiment" as used herein does not necessarily refer to the same embodiment and the phrase "in another embodiment" as used herein does not necessarily refer to a different embodiment. It is intended, for example, that claimed subject matter include combinations of exemplary embodiments in whole or in part.

In general, terminology may be understood at least in part from usage in context. For example, terms, such as "and", "or", or "and/or," may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" or "at least one" as used herein, depending at least in part upon context, may describe any feature, structure, or characteristic in a singular sense or may describe combinations of features, structures or characteristics in a plural sense. Similarly, terms, such as "a", "an", or "the", again, may be understood to convey a singular usage or to convey a plural usage, depending at least in part upon context. In addition, the term "based on" or "determined by" may be understood as not necessarily intended to convey an exclusive set of factors and may, instead, allow for existence of additional factors not necessarily expressly described, again, depending at least in part on context.

Figure 2A:
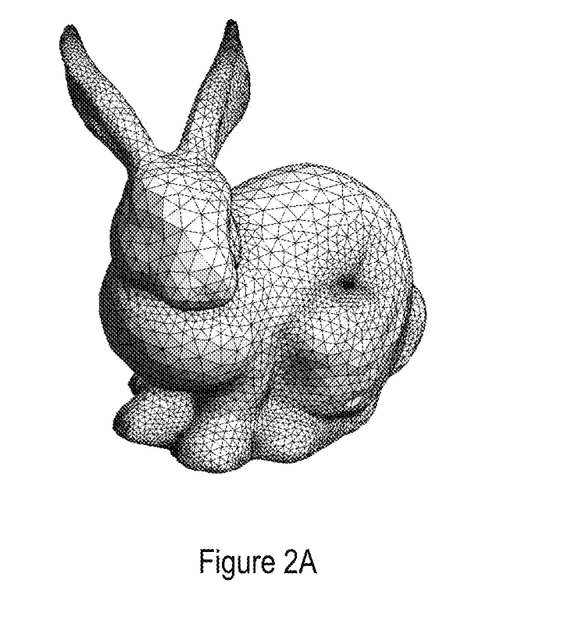
FIG. 2A shows a domain of a surface of a bunny in three-dimensional space.

The present disclosure describes a method and a device for image inpainting on an arbitrary surface in three-dimensional space utilizing a partial differential equation. In one embodiment of the disclosure, the arbitrary surface in three-dimensional space may be a relatively simple surface, such as a surface of a smooth sphere. In another embodiment of the disclosure, the arbitrary surface in three-dimensional space may be a relatively complicated surface, such as a surface of a bunny, as shown in FIG. 2A.

Figure 2B:
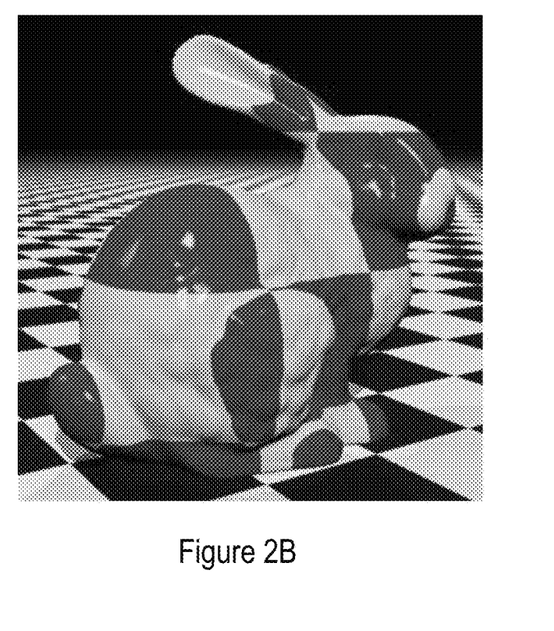
FIG. 2B shows a three-dimensional image on the domain as shown in FIG. 2A.

A three-dimensional image is an image on a surface in a three-dimensional space. FIG. 2B shows an example of a three-dimensional image on the surface of the bunny in the three-dimensional space.

In one embodiment, image inpainting may be used to reconstruct a region of a three-dimensional image, where the image or texture of the region is damaged or lost. The damaged and lost image/texture information may be due to noise interference or disruption during data transmission of the image, or due to issues during the acquisition of the three-dimensional image, for example and not limited to, the acquisition of the three-dimensional image from a three-dimensional scanner.

In another embodiment, image inpainting may be used to reconstruct a substitute image on a region of a three-dimensional image, where an original image on the region needs to be removed. The removal of the original image on the region may be due to privacy considerations, so private information in the three-dimensional image will be removed, for example and not limited to, a license plate of an automobile. The removal of the original image on the region may be due to other considerations, so that undesired information in the three-dimensional image will be removed, for example and not limited to, freckles on a person's face.

Three major methods are used for image inpainting on two-dimensional images, namely a texture synthesis method, a sparse method, and a partial differential equation and variation method. Previously existing methods only work on simple two-dimensional images and do not work very well on three-dimensional images on arbitrary surfaces. One of the existing problems between simple two-dimensional image and three-dimensional images on arbitrary surfaces is the mapping relationship between the arbitrary surfaces and the two-dimensional space may not be feasible. Even if, in limited situations, a mapping may be feasible, the three-dimensional image will become distorted to a certain degree according to the curvature of the surface.

This present disclosure describes a method using a partial differential equation, which works well on three-dimensional images on arbitrary surfaces, thus improving the image inpainting technology and solving the existing problems.

Figure 3:
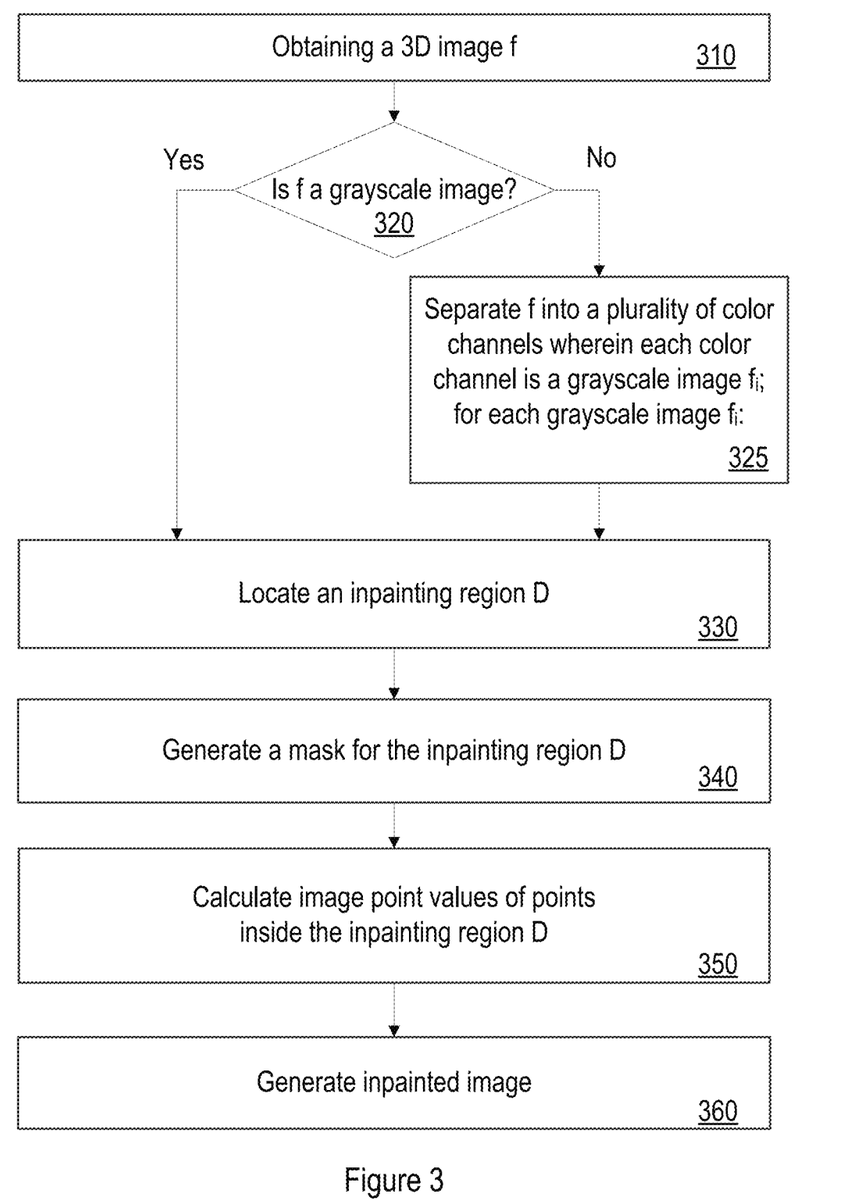
FIG. 3 shows a block diagram for performing image inpainting on a three-dimensional image.

FIG. 3 shows a method for image inpainting on arbitrary surfaces in a three-dimensional space. The method includes step 310 of obtaining a three-dimensional (3D) image f, which is an image on a surface in 3D space. Each point of the 3D image f comprises an image point value and a position vector in the 3D space. The image point value represents a pixel value of the point of the 3D image. The position vector represents a spatial location of the point of the 3D image. The position vector may be a vector including an x-axis component along the x-axis, a y-axis component along the y-axis, and a z-axis component along the z-axis.

When the 3D image is a grayscale image, the image point value may include a single value. The single value may be an 8-bit, 16-bit, or 32-bit integer, representing a grayscale value of the point of the 3D image.

When the 3D image is a color image, the image point value may include more than one color value. Each color value may be an 8-bit, 16-bit, or 32-bit integer, representing a color channel. In one embodiment, the image point value may include three values, representing a red channel, a green channel, and a blue channel, respectively.

The 3D image f may be stored in a local storage medium. The 3D image f may be also stored in a remote storage medium and obtained through a wireless or wired network. The 3D image f may also be acquired from a device in real-time, for example and not limited to, a 3D scanner.

The method includes step 320 of determining whether the 3D image f is a grayscale image. When the 3D image is a grayscale image, the following steps 330, 340, 350, and 360 will be performed.

When the 3D image is a color image, the method includes step 325 of separating the 3D image f into several color channels and each color channel can be handled as a grayscale image. Therefore, the 3D color image is separated into several 3D grayscale images. For each 3D grayscale image separated from the 3D color image, the following steps 330, 340, 350, and 360 will be performed.

The method includes step 330 of locating an inpainting region D. The inpainting region D may be located based on the magnitude of the image point value. In one embodiment, when the image point value of a position in the 3D image is above a high-threshold value, the position may be selected as a part of the inpainting region D. For example, the high-threshold value may be 250 for 8-bit image point values or 65,500 for 16-bit image point values. In another embodiment, when the image point value of a position in the 3D image is below a low-threshold value, the position may be selected as a part of the inpainting region D. For example, the low-threshold value may be 10 or 5. In another embodiment, when the image point value of a position in the 3D image is equal to a pre-determined special value, the position may be located as a part of the inpainting region D.

The inpainting region D may also be located based on a pattern of magnitudes of the image point values. The pattern may be identified from a library of pre-defined patterns. In other embodiments, the inpainting region D may be located according to an operator's input.

The method includes step 340 of generating an inpainting mask for the region D. After the inpainting region D is located, the inpainting mask for the inpainting region D is generated. The inpainting mask may be used to mask off the original image point values of the inpainting region D. In one embodiment, the inpainting mask may be used to set the original image point values of the inpainting region D to a pre-defined constant value. For example, the pre-defined constant value may be zero.

The method includes step 350 of calculating image point values of points inside the inpainting region D. Step 350 includes a few steps, as shown in FIG. 4.

Figure 4:
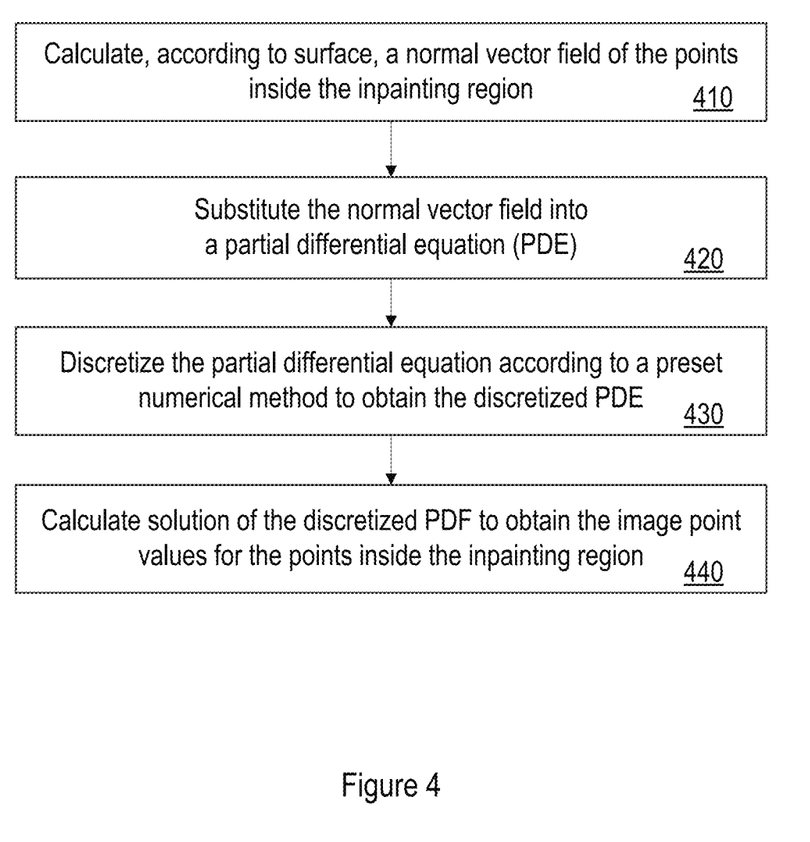
FIG. 4 shows a block diagram for calculating image point values of points inside the inpainting region.
Figure 5:
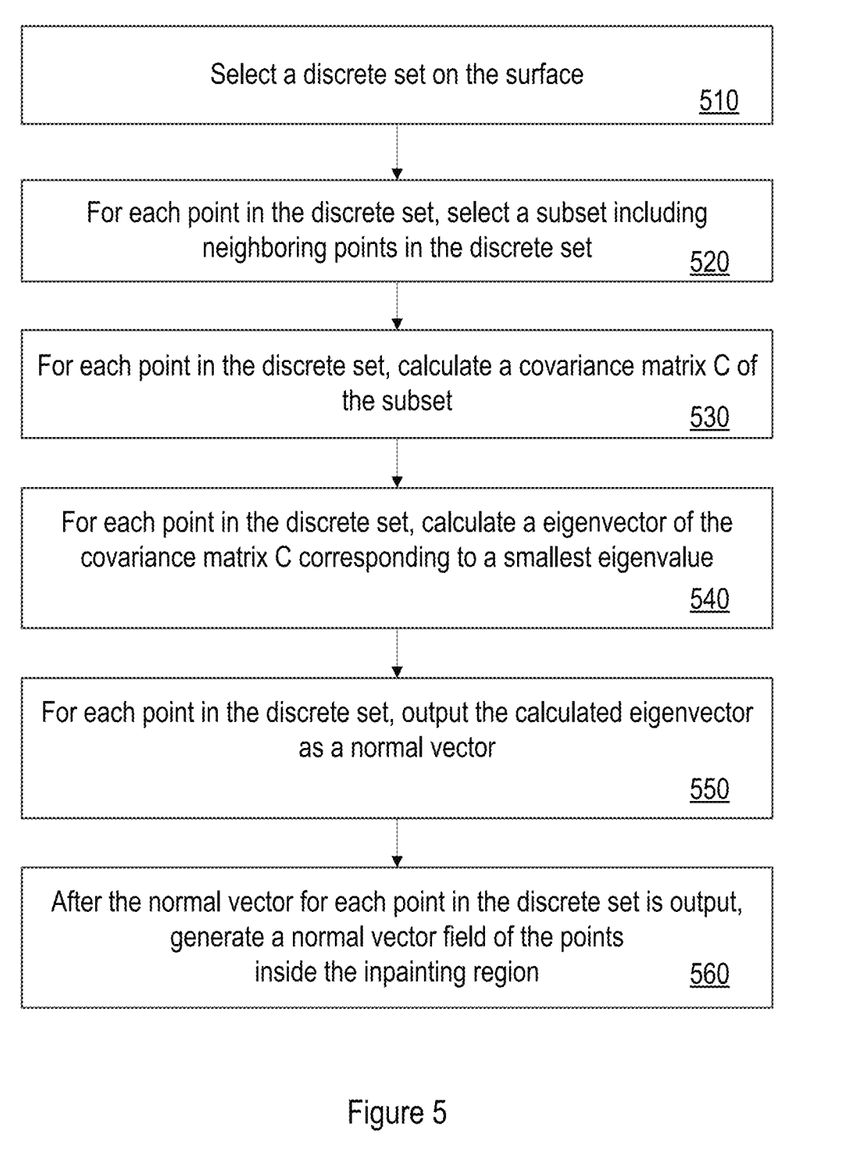
FIG. 5 shows a block diagram for calculating a normal vector field of the points inside the inpainting region.

FIG. 4 shows a method for calculating the image point values of points inside the inpainting region D. The method includes step 410 of calculating a normal vector field of the points inside the inpainting region. The 3D image is on the surface in 3D space. For each point of the 3D image on the surface, the surface may have a certain curvature, and thus there is a normal vector for each point on the surface. All normal vectors for the points inside the inpainting region D form a normal vector field. Step 410 may include a few steps, as shown in FIG. 5.

Step 410 may include step 510 of selecting a discrete set $\Omega$ comprising M points on the surface S in the three-dimensional space, wherein $\Omega = \{x_i: i=1, \ldots, M\}$.

For each point $x_i$ in the discrete set, step 410 may include step 520 of selecting a subset $\Omega_i$ comprising N points in the discrete set $\Omega$, wherein the subset $\Omega_i$ comprises neighboring points around the $x_i$. N is an integer larger than 2. In a general situation, N may be any number between 5 and 10 inclusive.

For each point $x_i$ in the discrete set, step 410 may include step 530 of calculating a covariance matrix C of the subset $\Omega_i$. The covariance matrix $C = YY^T$, where m is a centroid of the subset $\Omega_i$ and $$m = \frac{1}{N}\sum_{i=1}^{N} x_i,$$

Y is a 3 by N matrix comprising $[y_1\ y_2\ \ldots\ y_N]$ and $y_i = x_i - m$.

For each point $x_i$ in the discrete set $\Omega$, step 410 may include step 540 of calculating a eigenvector of the covariance matrix C corresponding to a smallest eigenvalue of the covariance matrix C; and step 550 of outputting the calculated eigenvector as a normal vector of the $x_i$.

After the normal vector for each point in the discrete set is obtained, step 410 may include step 560 of generating, based on the normal vector of each point $x_i$ in the discrete set $\Omega$, the normal vector field of the points inside the inpainting region D.

After the normal vector field is generated, the method further includes step 420 of substituting the normal vector field into a partial differential equation (PDE). In some embodiments, the PDE includes a transport equation with nonlinear anisotropic diffusion contribution.

In one embodiment of the present disclosure, the PDE comprises $$\begin{cases} \frac{\partial u_S}{\partial t} + v \cdot \nabla_S \Delta_S u_S = \mu \nabla_S \cdot (g(\|\nabla_S u_S\|)\nabla_S u_S), & \text{in } D; \\ u_S = f, & \text{on } \partial D \end{cases} \quad \text{(Equation 1)}$$

where $u_S$ comprises image point values on the surface S in the three-dimensional space, v comprises a velocity field, n comprises the normal vector field, and $v = n \times \nabla u_S$, $\nabla_S$ comprises a pre-defined surface gradient operator as $\nabla - n\partial_n$, $\Delta_S$ comprises a surface Laplacian vector as $\Delta - H_S \partial_n - \partial_n^{(2)}$, $H_S$ comprises a mean curvature of the surface S as $\text{trace}(J(n)(I - nn^T))$, $J(n)$ comprises a Jacobian matrix $$J(n) = \begin{bmatrix} \frac{\partial n^1}{\partial x} & \frac{\partial n^1}{\partial y} & \frac{\partial n^1}{\partial z} \\ \frac{\partial n^2}{\partial x} & \frac{\partial n^2}{\partial y} & \frac{\partial n^2}{\partial z} \\ \frac{\partial n^3}{\partial x} & \frac{\partial n^3}{\partial y} & \frac{\partial n^3}{\partial z} \end{bmatrix}, J(\nabla u) = \begin{bmatrix} \frac{\partial^2 u_S}{\partial x^2} & \frac{\partial^2 u_S}{\partial y \partial x} & \frac{\partial^2 u_S}{\partial z \partial x} \\ \frac{\partial^2 u_S}{\partial x \partial y} & \frac{\partial^2 u_S}{\partial y^2} & \frac{\partial^2 u_S}{\partial z \partial y} \\ \frac{\partial^2 u_S}{\partial x \partial z} & \frac{\partial^2 u_S}{\partial y \partial z} & \frac{\partial^2 u_S}{\partial z^2} \end{bmatrix},$$

$\mu$ comprises a diffusion constant for an anisotropic diffusion, g comprises an anisotropic diffusion function, and $f: S \mapsto R$ is the image on the surface S.

For a convection term in Equation 1, the velocity field v may be set to be a bi-normal vector field of the surface S. For a two-dimensional inpainting algorithm, a velocity field is orthogonal to a gradient of the images. To generalize the two-dimensional inpainting algorithm to three-dimensional space, the Laplace-Beltrami of $u\Delta_S u$ is generalized from a two-dimensional Laplacian of u in the two-dimensional inpainting algorithm to a three-dimensional Laplacian. Therefore, the convection term may be used to obtain the edge information of the image intensity, and inpaint the image from the boundary along the edge of the image intensity.

In one embodiment, the inpainting may be done by solving Equation 1 with only the transport term, i.e., by setting the diffusion constant $\mu$ as zero. In other embodiments, the anisotropic diffusion term may be desirable because it may stabilize the numerical instability.

In Equation 1, the anisotropic diffusion instead of a linear diffusion is chosen because of its edge preserving property. Considering the linear diffusion may smooth out edges, which are desirable to be preserved, the anisotropic diffusion is chosen for edge enhancement. In one embodiment, the anisotropic diffusion function may be $$g(\|\nabla_S u\|) = \frac{1}{1 + \|\nabla_S u\|^2 / K}$$

and K is a preset value. For example, K may be a preset value between 0.01 and 10 inclusive. In other embodiments of the present disclosure, the anisotropic diffusion function may be $g(\|\nabla_S u\|) = e^{-\|\nabla_S u\|^2 / K}$ and K is a preset value. For example, K may be a preset value between 0.01 and 10 inclusive.

Figure 6:
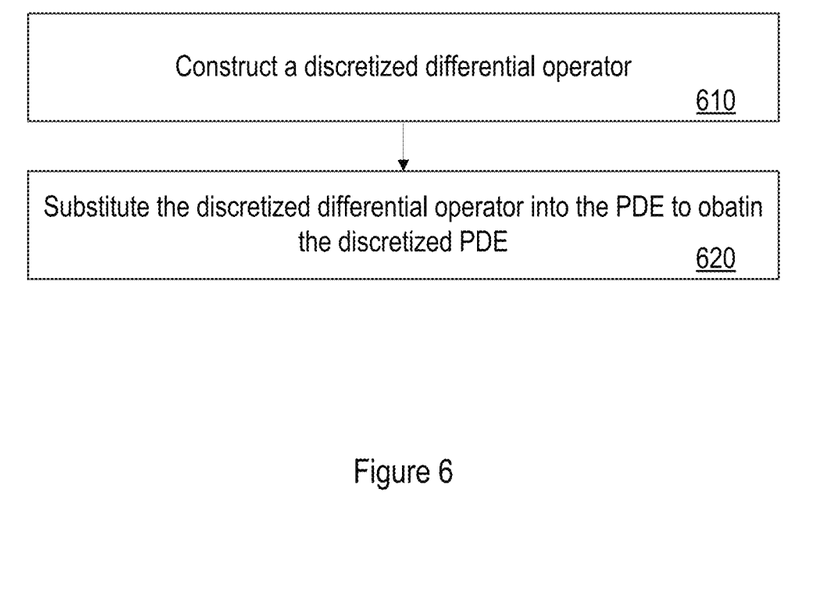
FIG. 6 shows a block diagram for discretizing a partial differential equation (PDE) according to a preset numerical method to obtain a discretized PDE.

The method includes step 430 of discretizing the PDE according to a preset numerical method to obtain the discretized PDE. In one embodiment of the present disclosure, a surface PDE may be discretized with radial basis function. Step 430 may include a few steps, as shown in FIG. 6.

Step 430 may include step 610 of constructing a discretized differential operator $\mathcal{L}$. In one embodiment of the present disclosure, there is $\Omega \subset S$ as a discrete set of M points on the surface S, and $\Omega_i = \{x_1^i, \ldots, x_N^i\} \subset \Omega$ as a small subset of N points in $\Omega$ around a point $x_i \in \Omega$, and $\varphi^i : \Omega_i \times \Omega_i \mapsto \mathbb{R}$ as a symmetric positive definite kernel on $\Omega_i$. An approximation may be taken as:

$$u^i(x) = \sum_{i=1}^{N} \lambda_j^i \varphi^i(x, x_j^i). \qquad \text{(Equation 2)}$$

Several differential operators with Equation 2 may be approximated to solve the coefficients $\lambda_i$ according to some approximation conditions. The discretized differential operator $\mathcal{L}$ may be a linear differential operator, and its corresponding approximation form may be given by a matrix L. The discretized differential operator $\mathcal{L}$ may be represented by $\mathcal{L} u|_{\alpha=x_j} \approx L^i u(\Omega_i)$, where $L^i$ is a row vector of the discretization of $\mathcal{L}^i$, and $u(\Omega_i) = [u(x_1^i) u(x_2^i) \ldots u(x_N^i)]^T$.

The row vector $L^i$ may be obtained by solving a linear system. The linear system to be solved may be $L^i K^i = b^i$, where $K_{h,k}^i = \varphi(x_h^i, x_k^i)$ and $b_j^i = \mathcal{L} \varphi^i(x_i, x_j^i)$.

The calculated coefficients $\lambda_i$ may be substituted into Equation 2, so that a matrix $\hat{L}$ is obtained. The matrix $\hat{L}$ may be approximated to satisfy $\mathcal{L} u(\Omega) \approx \hat{L} u(\Omega)$, where $u(\Omega)_j = u(x_j)$, $x_j \in \Omega$, $\hat{L}_{(i,j)} = L^i$ which may also mean the i-th row of the matrix $\hat{L}$ as the row vector $L^i$. In other embodiment, the matrix $\hat{L}$ may be sparse, and the locality of the matrix $\hat{L}$ may be controlled by a size of the neighboring point number N.

Step 430 may include step 620 of substituting, by the device, the discretized differential operator $\mathcal{L}$ into the PDE to obtain the discretized PDE. In one embodiment of the present disclosure, when the discretized differential operator $\mathcal{L}$ is substituted into the PDE in Equation 1, a discretized PDE is obtained as $$\frac{du(t)}{dt} = F(u(t)),$$

$u(0) = u_0$, where $[u(t)]_j = u(x_j, t)$, and F comprises an nonlinear function combining the discretized differential operator $L_a$. $u_0$ is an initial condition and is set to be the image to be inpainted. In other embodiment of the present disclosure, there may be a differential operator $\mathcal{L}_a := \partial_a$, where $a \in \{x, y, z, xx, yy, zz, xy, yz, xz\}$.

The method further includes step 440 of calculating, with a preset approximation method and a preset numerical solver, a solution of the discretized PDE to obtain the image point values for the points inside the inpainting region D.

In one embodiment of the present disclosure, the discretized PDE may be solved by applying a simple forward Euler method on the discretized PDE, and calculating the solution of the discretized PDE as $u_{k+1}$ to obtain the image point values for the points inside the inpainting region D. For k is an integer larger than 1, $u_{k+1} = u_k + \Delta t F(u_k)$. To solve the discretized PDE, $\Delta t$ may be a preset value between 0.0001 and 0.1 inclusive, and be small enough to guarantee the stability of calculation.

The method includes step 360 of generating an inpainted image on the surface S in the three-dimensional space. The inpainted image may be generated based on the calculated image point values for the points inside the inpainting region. The inpainted image is also a 3D image on the surface.

When an original 3D image is a color image, the method may further include merging the generated inpainted image for each color channel of the original 3D image to generate an inpainted 3D color image.

The method may further include outputting the inpainted 3D image. The inpainted 3D image may be output to a storage medium or a computer database. The storage medium or the computer database may be locally located or remotely located and communicated via a network connection. In other embodiments, the inpainted 3D image may be output to a display device, for example but not limited to, a 3D television and/or a 3D goggle.

In one embodiment of the present disclosure, the eigenvector of a covariance matrix C may be calculated with the following method to obtain the normal vector. The covariance matrix C may be a symmetric positive definite matrix, and may always have non-negative eigenvalues $\lambda_i \geq 0$, i=1, 2, 3. An inverse iteration method may be applied to obtain the eigenvector corresponding to the smallest eigenvalue.

An initial guess vector is assigned to the eigenvector as $v_0$. The initial guess vector may be an arbitrary three-dimensional vector, for example but not limited to, $v_0 = [1\ 1\ 1]^T$. For each iteration of $k \geq 1$, with a constant $\eta$, the following system is solved for v:

$$(C + \eta I)v = v_{k-1} \qquad \text{(Equation 3)}$$

$$v_k = \frac{v}{\|v\|}.$$

According to the calculated $v_k$ from Equation 3, the value of $\|v_k - v_{k-1}\|$ is calculated and compared with a predefined tolerance $\varepsilon$. For example and not limited to, the predefined tolerance $\varepsilon$ is a very small number between 10e-7 and 10e-5 inclusive. When the value of $\|v_k - v_{k-1}\|$ is smaller than or equal to the predefined tolerance $\varepsilon$, the iteration is stopped. When the value of $\|v_k - v_{k-1}\|$ is not smaller than or equal to the predefined tolerance $\varepsilon$, the next iteration is continued until $\|v_k - v_{k-1}\| \leq \varepsilon$. When the iteration is stopped, the calculated $v_k$ from Equation 3 is the eigenvector corresponding to the smallest eigenvalue.

In other embodiment of the present disclosure, the eigenvector of a covariance matrix C may be calculated with another method to obtain the normal vector. Since the eigenvalues of the covariance matrix C is non-negative and the eigenvector corresponding to the smallest eigenvalue is desirable, the constant $\eta$ may be set as zero. Considering that a linear system is required to solve for each iteration and the covariance matrix C remains unchanged throughout the iterations, Cholesky decomposition may be applied to the covariance matrix C. Therefore, $C = R^T R$, where R is an upper triangular matrix.

An initial guess vector is assigned to the eigenvector as $v_0$. The initial guess vector may be an arbitrary three-dimensional vector, for example but not limited to, $v_0 = [1\ 1\ 1]^T$. For each iteration of $k \geq 1$, $R^T y = v_{k-1}$ may be solved for y with forward substitution; $Rv = y$ may be solved for v with backward substitution, and $v_k$ is calculated based on $$v_k = \frac{v}{\|v\|}.$$

For each iteration, based on the calculated $v_k$, the value of $\|v_k-v_{k-1}\|$ is calculated and compared with a predefined tolerance $\varepsilon$. For example and not limited to, the predefined tolerance $\varepsilon$ is a very small number between 10e-7 and 10e-5 inclusive. When the value of $\|v_k-v_{k-1}\|$ is smaller than or equal to the predefined tolerance $\varepsilon$, the iteration is stopped. When the value of $\|v_k-v_{k-1}\|$ is not smaller than or equal to the predefined tolerance $\varepsilon$, the iteration is continued until $\|v_k-v_{k-1}\|\leq\varepsilon$. When the iteration is stopped, the calculated $v_k$ is the eigenvector corresponding to the smallest eigenvalue.

Figure 7A:
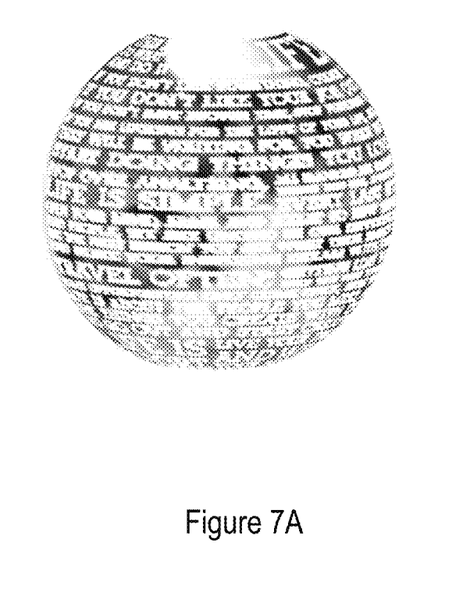
FIG. 7A shows a three-dimensional image with text on a hemisphere.
Figure 7B:
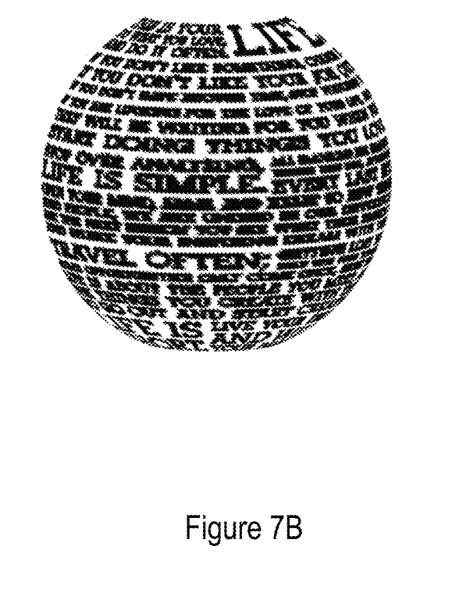
FIG. 7B shows a mask corresponding to the text in FIG. 7A.
Figure 7C:
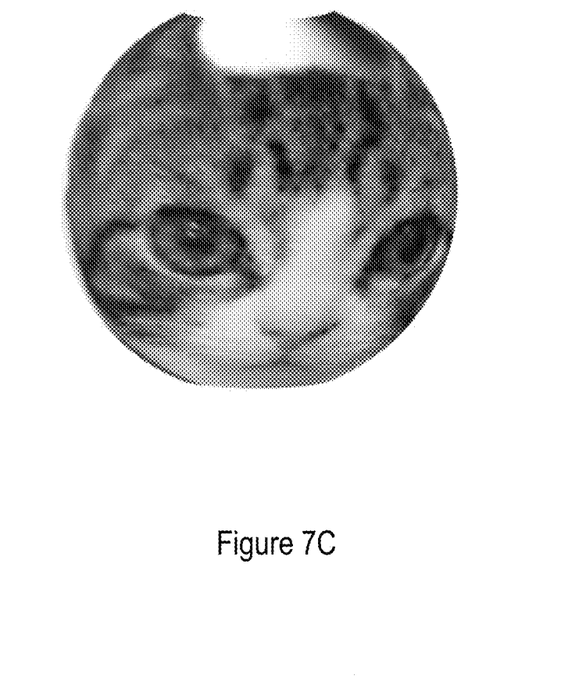
FIG. 7C shows an inpainted image according to the three-dimensional image in FIG. 7A.
Figure 7D:
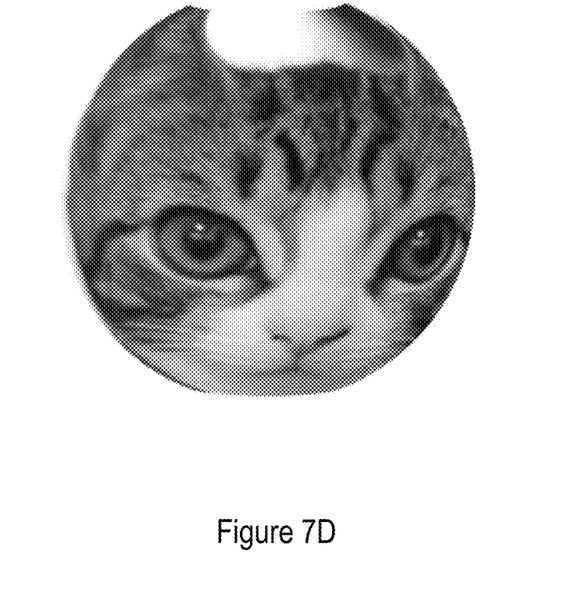
FIG. 7D shows an original three-dimensional image without text on the hemisphere.

In another embodiment of the present disclosure, as shown in FIG. 7A, a three-dimensional color image on a surface of a hemisphere is obtained. The 3D image contains some text, and it is desirable to remove the text and inpaint regions occupied by the text. Based on the text in the 3D image, an inpainting region is identified and a mask is created as shown in FIG. 7B. The method of this present disclosure is applied to the 3D image and an inpainted image is generated, as shown in FIG. 7C. To show the successful implementation of the disclosed method, the original 3D image on the hemisphere is shown in FIG. 7D for reference. During the image inpainting process, K is taken as 0.01, and N is taken as 10.

Through the descriptions of the preceding embodiments, persons skilled in the art may understand that the methods according to the foregoing embodiments may be implemented by hardware only or by software and a necessary universal hardware platform. However, in most cases, using software and a necessary universal hardware platform are preferred. Based on such an understanding, the technical solutions of the present disclosure essentially, or the part contributing to the prior art may be implemented in a form of a software product. The computer software product is stored in a storage medium (such as a ROM/RAM, a magnetic disk, or an optical disc) and includes several instructions for instructing a terminal device (which may be a mobile phone, a computer, a server, a network device, or the like) to perform the methods described in the embodiments of the present disclosure.

While the particular invention has been described with reference to illustrative embodiments, this description is not meant to be limiting. Various modifications of the illustrative embodiments and additional embodiments of the invention, will be apparent to one of ordinary skill in the art from this description. Those skilled in the art will readily recognize these and various other modifications can be made to the exemplary embodiments, illustrated and described herein, without departing from the spirit and scope of the present invention. It is therefore contemplated that the appended claims will cover any such modifications and alternate embodiments. Certain proportions within the illustrations may be exaggerated, while other proportions may be minimized. Accordingly, the disclosure and the figures are to be regarded as illustrative rather than restrictive.

The invention claimed is:

1. A method for image inpainting, the method comprising:
    obtaining, by a device comprising a memory storing instructions and a processor in communication with the memory, a first three-dimensional image, wherein:
        the first three-dimensional image is an image on a surface S in three-dimensional space, and
        each point of the first three-dimensional image comprises an image point value and a position vector in the three-dimensional space;
    determining, by the device, whether the first three-dimensional image is a grayscale image;
    when it is determined that the first three-dimensional image is the grayscale image:
        locating, by the device, an inpainting region D of the first three-dimensional image;
    when it is determined that the first three-dimensional image is not the grayscale image:
        separating, by the device, the first three-dimensional image into a plurality of color channels wherein each of the plurality of color channels comprises an equivalent grayscale image, and
        for each of the plurality of color channels:
            locating, by the device, the inpainting region D of the each of the plurality of color channels;
    generating, by the device, an inpainting mask corresponding to the inpainting region D;
    calculating, by the device according to the inpainting region D, image point values for points inside the inpainting region D; and
    creating, by the device based on the calculated image point values for points inside the inpainting region D, a second three-dimensional image on the surface S in the three-dimensional space.

2. The method according to claim 1, wherein the creating, by the device based on the calculated image point values for points inside the inpainting region D, the second three-dimensional image on the surface S in the three-dimensional space comprises:
    when it is determined that the first three-dimensional image is not the grayscale image:
        for each of the plurality of color channels:
            creating, by the device based on the calculated image point values for points inside the inpainting region D, a three-dimensional image of each of the plurality of color channels; and
        merging, by the device, the three-dimensional image of each of the plurality of color channels to create the second three-dimensional image.

3. The method according to claim 1, further comprising:
    outputting, by the device, the second three-dimensional image to a computer database.

4. The method according to claim 1, wherein the calculating, by the device according to the inpainting region D, the image point values for the points inside the inpainting region D comprises:
    calculating, by the device according to the surface S in three-dimensional space, a normal vector field of the points inside the inpainting region D;
    substituting, by the device, the normal vector field into a partial differential equation (PDE);
    discretizing, by the device, the PDE according to a preset numerical method to obtain a discretized PDE; and
    calculating, by the device with a preset approximation method and a preset numerical solver, a solution of the discretized PDE to obtain the image point values for the points inside the inpainting region D.

5. The method according to claim 4, wherein the calculating, by the device according to the surface S in three-dimensional space, the normal vector field of the points inside the inpainting region D comprises;
    selecting, by the device, a discrete set $\Omega$ comprising M points on the surface S in the three-dimensional space, wherein $\Omega=\{x_i: i=1, \ldots, M\}$;

for each point $x_i$ in the discrete set $\Omega$:
- selecting, by the device, a subset $\Omega_i$ comprising N points in the discrete set $\Omega$, wherein the subset $\Omega_i$ comprises neighboring points around the $x_i$;
- calculating, by the device, a covariance matrix C of the subset $\Omega_i$, wherein:
  - m is a centroid of the subset $\Omega_i$ and $m=1/N\Sigma_{i=1}^{N} x_i$,
  - Y is a 3 by N matrix comprising $[y_1\ y_2\ \ldots\ y_N]$ and $y_i = x_i - m$, and
  - the covariance matrix $C = YY^T$;
- calculating, by the device, an eigenvector of the covariance matrix C corresponding to a smallest eigenvalue of the covariance matrix C; and
- outputting, by the device, the calculated eigenvector as a normal vector of the $x_i$; and generating, by the device based on the normal vector of each point $x_i$ in the discrete set $\Omega$, the normal vector field of the points inside the inpainting region D.

6. The method according to claim 5, wherein the calculating, by the device, the eigenvector of the covariance matrix C corresponding to the smallest eigenvalue of the covariance matrix C comprises;
- setting, by the device, an initial guess $v_0$;
- solving, by the device according to Cholesky decomposition, $C = R^T R$ to obtain R and $R^T$;
- for a previous iteration $v_{k-1}$ wherein $k \geq 1$:
  - solving, by the device according to a forward substitution, $R^T y = v_{k-1}$, solving, by the device according to a backward substitution, $Rv = y$, and
  - calculating, by the device for a current iteration, $v_k = v/\|v\|$;
- determining, by the device, whether a value of $\|v_k - v_{k-1}\|$ is smaller than or equal to a predefined tolerance $\varepsilon$;
- when it is determined that the value of $\|v_k - v_{k-1}\|$ is not smaller than or equal to the predefined tolerance $\varepsilon$, , continuing, by the device, a next iteration until $\|v_k - v_{k-1}\| \leq \varepsilon$;
- when it is determined that the value of $\|v_k - v_{k-1}\|$ is smaller than or equal to the predefined tolerance $\varepsilon$, stopping, by the device, the next iteration; and
- outputting, by the device, $v_k$ as the eigenvector of the covariance matrix C.

7. The method according to claim 4, wherein:
the PDE comprises a first portion corresponding to a transport mechanism; and
the PDE comprises a second portion corresponding to a nonlinear anisotropic diffusion mechanism.

8. The method according to claim 4, wherein:
the PDE comprises $$\begin{cases} \frac{\partial u_S}{\partial t} + v \cdot \nabla_S \Delta_S u_S = \mu \nabla_S \cdot (g(\|\nabla_S u_S\|) \nabla_S u_S), & \text{in } D; \\ u_S = f, & \text{on } \partial D \end{cases},$$

wherein:
- $u_S$ comprises image point values on the surface S in the three-dimensional space;
- v comprises a velocity field, n comprises the normal vector field, and $v = n \times \nabla u_S$;
- $\nabla_S$ comprises a pre-defined surface gradient operator as $\nabla - n\partial_n$;
- $\Delta_S$ comprises a surface Laplacian vector as $\Delta - H_S \partial_n - \partial_n^{(2)}$;
- $H_S$ comprises a mean curvature of the surface S as trace$(J(n)(I - nn^T))$ and $J(n)$ comprises a Jacobian matrix $$J(n) = \begin{bmatrix} \frac{\partial n^1}{\partial x} & \frac{\partial n^1}{\partial y} & \frac{\partial n^1}{\partial z} \\ \frac{\partial n^2}{\partial x} & \frac{\partial n^2}{\partial y} & \frac{\partial n^2}{\partial z} \\ \frac{\partial n^3}{\partial x} & \frac{\partial n^3}{\partial y} & \frac{\partial n^3}{\partial z} \end{bmatrix};$$

- $\mu$ comprises a diffusion constant for an anisotropic diffusion; and
- g comprises an anisotropic diffusion function.

9. The method according to claim 8, wherein:
the anisotropic diffusion function comprises $g(\|\nabla_S u\|) = 1/1 + \|\nabla_S u\|^2 / K$ and K is a preset value.

10. The method according to claim 8, wherein:
the anisotropic diffusion function comprises $g(\|\nabla_S u\|) = e^{-\|\nabla_S u\|^2 / K}$ and K is a preset value.

11. The method according to claim 4, wherein the discretizing, by the device, the PDE according to the preset numerical method to obtain the discretized PDE, comprises:
- constructing, by the device, a discretized differential operator $\mathcal{L}$, wherein:
  - the discretized differential operator $\mathcal{L}$ is approximated by a discretized differential operator matrix L, and
  - the discretized differential operator matrix L comprises $L^i$ and satisfies $L^i K^i = b^i$, wherein $K_{h,k}^{\ i} = \varphi(x_h^i, x_k^i)$, $b_j^i = \mathcal{L} \varphi^i(x_i, x_j^i)$, and $\varphi^i$ comprises an asymmetric positive definite kernel function;
- substituting, by the device, the discretized differential operator $\mathcal{L}$ into the PDE to obtain the discretized PDE, wherein the discretized PDE is $du(t)/dt = F(u(t))$, $u(0) = u_0$, wherein $[u(t)]_j = u(x_j, t)$, and F comprises an nonlinear function combining the discretized differential operator $\mathcal{L}$.

12. The method according to claim 4, wherein the calculating, by the device with the preset approximation method and the preset numerical solver, the solution of the discretized PDE to obtain the image point values for the points inside the inpainting region D comprises:
- applying, by the device, a simple forward Euler method on the discretized PDE;
- calculating, by the device, the solution of the discretized PDE as $u_{k+1}$, wherein:
  - k is an integer larger than 1,
  - $u_{k+1} = u_k + \Delta t F(u_k)$, and
  - $\Delta t$ is a preset small value; and
- obtaining, by the device according to the solution of the discretized PDE, the image point values for the points inside the inpainting region D.

13. The method according to claim 1, wherein the obtaining the first three-dimensional image comprises:
obtaining, by the device, the first three-dimensional image from a storage medium.

14. The method according to claim 1, wherein the obtaining the first three-dimensional image comprises:
obtaining, by the device, the first three-dimensional image from a three-dimensional image scanner.

15. A device for imaging inpainting, the device comprising:
- a memory storing instructions; and
- a processor in communication with the memory, wherein, when the processor executes the instructions, the processor is configured to cause the device to:

obtain a first three-dimensional image, wherein:
the first three-dimensional image is an image on a surface S in three-dimensional space, and
each point of the first three-dimensional image comprises an image point value and a position vector in the three-dimensional space,
determine whether the first three-dimensional image is a grayscale image,
when it is determined that the first three-dimensional image is the grayscale image:
locate an inpainting region D of the first three-dimensional image, and
when it is determined that the first three-dimensional image is not the grayscale image:
separate the first three-dimensional image into a plurality of color channels wherein each of the plurality of color channels comprises an equivalent grayscale image, and
for each of the plurality of color channels:
locate the inpainting region D of the each of the plurality of color channels,
generate an inpainting mask corresponding to the inpainting region D,
calculate, according to the inpainting region D, image point values for points inside the inpainting region D, and
create, based on the calculated image point values for points inside the inpainting region D, a second three-dimensional image on the surface S in the three-dimensional space.

16. The device according to claim 15, wherein, when the processor is configured to cause the device to calculate, according to the inpainting region D, the image point values for points inside the inpainting region D, the processor is configured to cause the device to:
calculate, according to the surface S in three-dimensional space, a normal vector field of the points inside the inpainting region D;
substitute the normal vector field into a partial differential equation (PDE);
discretize the PDE according to a preset numerical method to obtain a discretized PDE; and
calculate, with a preset approximation method and a preset numerical solver, a solution of the discretized PDE to obtain the image point values for the points inside the inpainting region D.

17. The device according to claim 16, wherein the PDE comprises $$\begin{cases} \frac{\partial u_S}{\partial t} + v \cdot \nabla_S \Delta_S u_S = \mu \nabla_S \cdot (g(\|\nabla_S u_S\|) \nabla_S u_S), & \text{in } D; \\ u_S = f, & \text{on } \partial D \end{cases},$$

wherein:
$u_S$ comprises image point values on the surface S in the three-dimensional space;
v comprises a velocity field, n comprises the normal vector field, and $v = n \times \nabla u_S$;
$\nabla_S$ comprises a pre-defined surface gradient operator as $\nabla - n \partial_n$;
$\Delta_S$ comprises a surface Laplacian vector as $\Delta - H_S \partial_n - \partial_n^{(2)}$;
$H_S$ comprises a mean curvature of the surface S as trace($J(n)(I - nn^T)$) and $J(n)$ comprises a Jacobian matrix $$J(n) = \begin{bmatrix} \frac{\partial n^1}{\partial x} & \frac{\partial n^1}{\partial y} & \frac{\partial n^1}{\partial z} \\ \frac{\partial n^2}{\partial x} & \frac{\partial n^2}{\partial y} & \frac{\partial n^2}{\partial z} \\ \frac{\partial n^3}{\partial x} & \frac{\partial n^3}{\partial y} & \frac{\partial n^3}{\partial z} \end{bmatrix};$$

μ comprises a diffusion constant for an anisotropic diffusion; and
g comprises an anisotropic diffusion function.

18. A non-transitory computer readable storage medium storing instructions, wherein the instructions, when executed by a processor, cause the processor to perform:
obtaining a first three-dimensional image, wherein:
the first three-dimensional image is an image on a surface S in three-dimensional space, and
each point of the first three-dimensional image comprises an image point value and a position vector in the three-dimensional space;
determining whether the first three-dimensional image is a grayscale image;
when it is determined that the first three-dimensional image is the grayscale image:
locating an inpainting region D of the first three-dimensional image;
when it is determined that the first three-dimensional image is not the grayscale image:
separating the first three-dimensional image into a plurality of color channels wherein each of the plurality of color channels comprises an equivalent grayscale image, and
for each of the plurality of color channels:
locating the inpainting region D of the each of the plurality of color channels;
generating an inpainting mask corresponding to the inpainting region D;
calculating, according to the inpainting region D, image point values for points inside the inpainting region D; and
creating, based on the calculated image point values for points inside the inpainting region D, a second three-dimensional image on the surface S in the three-dimensional space.

19. The non-transitory computer readable storage medium according to claim 18, wherein, when the instructions cause the processor to perform calculating, according to the inpainting region D, the image point values for points inside the inpainting region D, the instructions further cause the processor to perform:
calculating, according to the surface S in three-dimensional space, a normal vector field of the points inside the inpainting region D;
substituting the normal vector field into a partial differential equation (PDE), wherein the PDE comprises $$\begin{cases} \frac{\partial u_S}{\partial t} + v \cdot \nabla_S \Delta_S u_S = \mu \nabla_S \cdot (g(\|\nabla_S u_S\|) \nabla_S u_S), & \text{in } D; \\ u_S = f, & \text{on } \partial D \end{cases},$$

wherein:
$u_S$ comprises image point values on the surface S in the three-dimensional space, v comprises a velocity field, n comprises the normal vector field, and $v = n \times \nabla u_S$, $\nabla_S$ comprises a pre-defined surface gradient operator as $\nabla - n \partial_n$, $\Delta_S$ comprises a surface Laplacian vector as $\Delta - H_S \partial_n - \partial_n^{(2)}$, $H_S$ comprises a mean curvature of the surface S as $\text{trace}(J(n)(I - nn^T))$ and $J(n)$ comprises a Jacobian matrix $$J(n) = \begin{bmatrix} \frac{\partial n^1}{\partial x} & \frac{\partial n^1}{\partial y} & \frac{\partial n^1}{\partial z} \\ \frac{\partial n^2}{\partial x} & \frac{\partial n^2}{\partial y} & \frac{\partial n^2}{\partial z} \\ \frac{\partial n^3}{\partial x} & \frac{\partial n^3}{\partial y} & \frac{\partial n^3}{\partial z} \end{bmatrix},$$

$\mu$ comprises a diffusion constant for an anisotropic diffusion, and g comprises an anisotropic diffusion function;

discretizing the PDE according to a preset numerical method to obtain a discretized PDE; and calculating, with a preset approximation method and a preset numerical solver, a solution of the discretized PDE to obtain the image point values for the points inside the inpainting region D.

\* \* \* \* \*

UNITED STATES PATENT AND TRADEMARK OFFICE
CERTIFICATE OF CORRECTION

PATENT NO. : 10,593,024 B2
APPLICATION NO. : 15/945576
DATED : March 17, 2020
INVENTOR(S) : Ka Chun Cheung Page 1 of 1

It is certified that error appears in the above-identified patent and that said Letters Patent is hereby corrected as shown below:

In the Claims

In Column 11, Claim 6, Line 28, delete "$R^T{}_y = v_{k-1}$" and insert in its place -- $R^T y = v_{k-1}$ --.

In Column 12, Claim 9, Line 15, delete "$1 + \|\nabla_s u\|^2 / K$" and insert in its place -- $(1 + \|\nabla_s u\|^2 / K)$ --.

Signed and Sealed this
Ninth Day of June, 2020

Andrei Iancu
*Director of the United States Patent and Trademark Office*